United States Patent Office 3,066,117

Patented Nov. 27, 1962

3,066,117
LIGHT-SENSITIVE WATER SOLUBLE COMPOUNDS

Wilhelm Thoma and Heinrich Rinke, Leverkusen, Germany, assignors of one-half to Farbenfabriken Bayer Aktiengesellschaft, Leverkusen, Germany, a corporation of Germany, and one-half to Mobay Chemical Company, Pittsburgh, Pa., a corporation of Delaware

No Drawing. Filed Feb. 7, 1958, Ser. No. 713,786
Claims priority, application Germany Feb. 8, 1957
2 Claims. (Cl. 260—77.5)

This invention relates generally to the preparation of water soluble compounds which become water insoluble when exposed to actinic light and, more particularly, to such compounds and a method for making reproductions with them in aqueous medium.

Polymers or polycondensates containing the cinnamoyl or chalcone radical which are soluble in organic solvents have been used heretofore in the reproduction art. Compounds containing these radicals may be dissolved in a suitable solvent therefor and the resulting solution may be exposed to actinic light to produce a compound which is insoluble in the solvent. The compounds become insoluble in the solvent when exposed to light through cross-linking with the formation of compounds of greater molecular weight. Such a process has many advantages but it has been found that the insoluble product obtained through crosslinking has a tendency to swell when it is developed by exposure to an aqueous medium, especially if the aqueous medium contains salts. This disadvantage has required the use of organic solvents as the developer in many instances. Such solvents are costly and introduce a problem because the fumes from the developer bath must be disposed of.

It is, therefore, an object of this invention to provide a series of compounds which can be used in the reproduction art without the disadvantages inherent in the heretofore available processes. Another object of the invention is to provide a novel method for making reproductions which is devoid of the foregoing disadvantages. Still another object of the invention is to provide a new class of compounds which are soluble and become sparingly soluble or insoluble upon exposure to actinic light. Still other objects will become apparent from the following description.

The foregoing objects and others are accomplished in accordance with this invention by providing a class of compounds containing the cinnamoyl or chalcone radical and which are soluble in an aqueous medium. More specifically, the invention provides a class of compounds which contain the grouping —CH=CH—CO— bonded to aromatic nuclei which are soluble in an aqueous medium but cross link when exposed to actinic light, such as, for example, ultra-violet light, to form compounds which are insoluble in the aqueous medium or at most only sparingly soluble therein.

"Solubility in aqueous media" as used herein is to be understood to mean solubility in water or dilute aqueous acids or dilute aqueous alkalies such, for instance, acetic acid, formic acid, hydrochloric acid, sulfuric acid, ammonia, sodium hydroxide, sodium carbonate, potassium hydroxide and potassium carbonate.

The light-sensitive substances which are readily soluble in aqueous media and a process of making reproductions with them offer a number of advantages over the compounds which are only soluble in organic solvents. For example, the development of coatings, films and the like made with the compounds provided by this invention can be effected with water, dilute aqueous acids or dilute aqueous alkalies after exposure of the films or coatings to actinic light. In this connection, a particular improvement obtained by the use of the present invention is that the insoluble areas cross-linked under the action of lights do not swell on being developed with aqueous media, especially those containing salts, this having so far been unavoidable in many cases when it was necessary to use organic solvents as developer. The precautionary measures necessary in the application of films from organic solvents are obviated. Moreover, water-soluble heavy metal salts, especially chromium salts, can be added to the aqueous solutions of the photo-sensitive substances for increasing the cross-linking.

The light-sensitive compounds soluble in aqueous media can be produced in various ways. For example, bifunctional or higher functional components containing the cinnamoyl or benzal-acetophenone radical once or several times may be subjected to polycondensation with bifunctional or higher functional substances which contain salt-forming or other water-solubilizing groups. Examples of reaction products of this type which are soluble in aqueous media and which can be used for the process of the invention are basic polyamides, basic polyesters, basic polyester amides, basic polyester urethanes, basic polyamide, urethanes, polyamide urea sulfonic or carboxylic acids, polyester-urea sulfonic and carboxylic acids.

Any suitable basic polyamide, basic polyester or basic polyester amide may be used. Those especially suitable for carrying out the process of the invention can be obtained, for example, by polycondensation of one or more 1,2-, 1,3- and/or more especially 1,4-phenylene bisacrylic acids, o-, m- and/or p-cinnamic carboxylic acids and/or chalcone dicarboxylic acids, such as indicated below

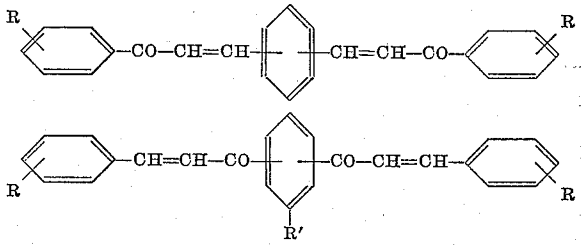

in which R represents COOH or —O—$(CH_2)_2$COOH and R′ represents —H or —$COCH_3$, with diamines having tertiary nitrogen atoms, for example with alpha, alpha′-diaminopropyl methylamine, with basic dialcohols, for example with N-alkyl diethanolamines or with amino alcohols of substantially the following type:

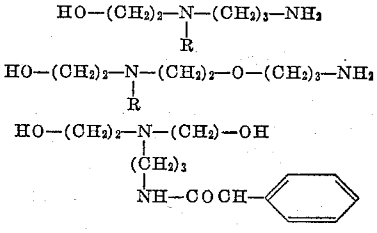

in which R represents any suitable hydrocarbon radical and particularly a lower alkyl radical, such as, for example, methyl, ethyl, propyl or the like. Instead of the free acids, it is, of course, also possible to use those derivatives thereof which form an amide or ester. It is moreover possible to include in the condensation mixture monomers which can be condensed and which do not contain any —CH=CH—CO— groups bonded to aromatic nuclei. Thus, for example, it is possible to condense one or more compounds containing the

—CH=CH—CO— group with an aliphatic or aromatic dicarboxylic acid, an omega-amino-carboxylic acid, for example, epsilon-amino-caproic acid or the lactams thereof, for example epsilon-caprolactam, aliphatic and cyclo-aliphatic dihydroxy compounds, hydroxycarboxylic acids, aliphatic diamines, for example diamino dicyclohexyl methane, amino alcohols, such as, for example, ethanolamine and propanolamine, or aliphatic diamino ethers, for example diamino propyl ether, $\alpha,\alpha'$-diaminopropyl glycol ether or generally those diamino ethers which are obtainable from any desired diol, but especially from those which contain several ethylene oxide groups or tetramethylene oxide groups between the hydroxyl groups after addition of acrylonitrile and subsequent hydrogenation.

The water solubility of the light-sensitive material can be varied within considerable limits by varying the proportion of the component not promoting water-solubility which is incorporated in the compound by condensation; this variation is in fact such that the relation between the original water solubility of the light-sensitive material and the insolubility of the product which is cross-linked after having been exposed to light can be varied in a very sensitive manner.

Any suitable basic polyester urethane may be used, such as, those obtained by reacting basic diol esters with diisocyanates. The necessary diol esters are produced from the previously mentioned dicarboxylic acids containing photo-sensitive groups and alkyl diethanolamines, for example N-methyl diethanolamine. Basic polyester urethanes are moreover obtainable from N-alkyl diethanolamines and diisocyanate-cinnamic acid glycol ester of the general formula

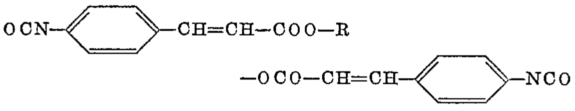

in which R represents —$(CH_2)_x$—, or $$—(CH_2)_2—X—(CH_2)_2—$$

X represents O, S or —O—$R_1$—O—, and $R_1$ represents an arylene radical. The reaction product of N-methyl diethanolamine and bis-(m-isocyanate cinnamic acid)-glycol ester is an example.

Any suitable polyamide urethane may be used, such as those obtained from the said photo-sensitive dicarboxylic acids or derivatives thereof by condensation with the following amino-alcohols containing tertiary nitrogen atoms:

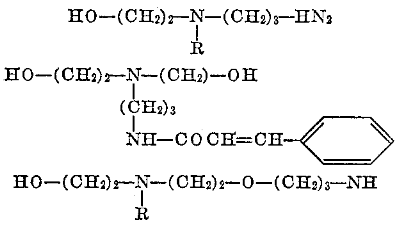

(in which R represents any desired hydrocarbon radical) and subsequent reaction with diisocyanates.

Suitable polyamide urea sulfonic or carboxylic acids can be produced in a three-stage reaction. From the said photo-sensitive dicarboxylic acids or their chlorides, it is also possible to obtain nitroamino sulfonic or nitroamino carboxylic acids, for example 6-nitrotoluidine-2-sulfonic acid, 4-nitro-2-aminobenzene sulfonic acid, 2-nitro-5-aminobenzene sulfonic acid, 2-nitro-4-aminobenzene sulfonic acid, 3-nitro-5-amino-benzoic acid, dinitroamido-sulfonic or carboxylic acids. After reduction of the nitro group but with preservation of the —CH=CH—CO— groups, the diamino-diamido-disulfonic or carboxylic obtained in this way are converted into the form of their salts with diisocyanates in accordance with the process disclosed in copending application Serial No. 660,769, now U.S. Patent No. 2,988,538. Polyamide urea sulfonic or carboxylic acids can also be obtained from any desired diaminosulfonic acids, for example 4,4′-diaminostilbene-2,2′-disulfonic acid, o- and m-benzidine disulfonic acids, p-phenylene diamine sulfonic acid, 2,6-diaminotoluene-4-sulfonic acid, 1,8-diamino-naphthalene-3,6-disulfonic acid, 1,6-hexanediamine sulfonic acid, 1,5-pentanediamino-3-sulfonic acid, or diamino carboxylic acids, for example 3,5-diaminobenzoic acid, *d,l*-lysine, *d,l*-ornithine, 1,5 - pentanediamine - 3 - methyl - 2,4 - dicarboxylic acid, by reaction with o-, m- or p-nitro cinnamic acid chloride, the nitro group being subsequently reduced with retention of the —CH=CH—CO groups and the diamino-diamido-sulfonic or carboxylic acids thus obtained being converted into the form of their salts with diisocyanates.

Polyester urea sulfonic or carboxylic acids can likewise be produced in a 3-stage reaction. The said photo-sensitive carboxylic acids, for example in the form of their chlorides, are reacted with nitrophenol sulfonic acids or nitrophenol carboxylic acids, for example with 4-nitrophenol-2-sulfonic acid, 2-nitrophenol-4-sulfonic acid, 6-chloro-2-nitrophenol-4-sulfonic acid or 3-nitro-2-hydroxybenzoic acid, 5-nitro-2-hydroxybenzoic acid or 3-nitro-4-hydroxybenzoic acid, the nitro groups are thereafter reduced, while preserving the —CH=CH—CO groups, and the diaminodiester sulfonic or carboxylic acids thus obtained are reacted in the form of their salts with diisocyanates. Polyester urea sulfonic or carboxylic acids can also be obtained from any desired dihydroxysulfonic acids or dihydroxycarboxylic acids, for example tartaric acid, by reaction with o-, m- or p-nitrocinnamic acid chloride to form dinitro-diester-sulfonic or carboxylic acids, subsequently reducing the nitro groups, while preserving the —CH=CH—CO— groups, and converting the diaminodiester-sulfonic or carboxylic acids thus obtained into salts thereof with diisocyanates.

Another synthesis principle for the production of light-sensitive compounds soluble in aqueous media is that substances which are already of relatively high molecular weight, carry primary and/or secondary amino groups and in addition other groups producing solubility in water or acid, such as, for example, tertiary amino groups or groups assisting the hydrophilic conditions, such as, for example, ether groups, are reacted with compounds containing monomeric cinnamoyl or benzalacetophenone radicals. Examples of such compounds of relatively high molecular weight are polyureas, basic polyamides, basic polyurethanes, polyaminotriazoles, polyethylene imine and basic polyepoxide resins. The basic substances of high molecular weight can in their turn already contain cinnamic acid or benzalacetophenone radicals in the chain.

For introducing the —CH=CH—CO— group into the aforementioned classes of basic compounds which are already of relatively high molecular weight, it is for example possible to use monomers of the general formulae

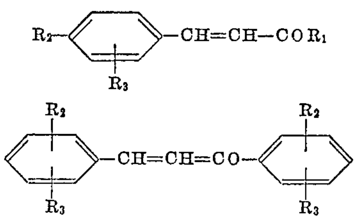

in which $R_1$ represents Hal or O—$R_4$; $R_2$ represents NCO, H, alkyl, aralkyl, aryl, NH—$COR_4$ or $COR_1$; $R_3$ represents Hal, H, —$NO_2$—CN, O-alkyl- N-$(alkyl)_2$, alkyl, aralkyl, aryl or —NH—$COR_4$; and $R_4$ represents alkyl, aryl or aralkyl.

Among the many monomers possible are cinnamic acid chloride, cinnamic acid esters, o-, m- and p-nitrocinnamic acid chloride, methoxy cinnamic acid methyl ester, m-isocyanate cinnamic acid ether ester, 4- or 4′-benzalacetophenone carboxylic acid chloride, 3- or 3′-benzalacetophenone carboxylic acid methyl ester, and 3- or 3′-isocyanato benzalacetophenone.

Basic polyureas for the reaction with monomers comprising these —CH=CH—CO— groups can be obtained in known manner from dialkylene triamines or alkylene polyamides, for example dipropylene triamine, α,α′-diaminopropyl methylamine and diisocyanates, for example hexane diisocyanate. Examples of other diisocyanates usable for the production of basic polyureas are the diisocyanate cinnamic acid glycol esters which have already been mentioned. In this way, basic polyureas are obtained which already contain photo-sensitive groups in the high molecular chain.

Basic polyamides can for example be produced in known manner by using amines with two primary and one or more secondary or tertiary amino groups. Examples are dipropylene triamine, spermine, and α,α′-diaminopropyl methyl amine. Suitable amines can be produced quite generally by symmetrical addition of 2 mols of acrylonitrile to a bifunctional amine with subsequent hydrogenation. Basic polyamides are obtained from amines of the said type by reaction with oxalic esters and/or other derivatives of dicarboxylic acids which form polyamides. Diamino ethers for example diamino-dipropyl glycol ethers, can be concurrently incorporated by condensation. Dicarboxylic acids which already contain

—CH=CH—CO— groups yield basic polyamides which already contain photo-sensitive groups in the polymer chain.

Basic polyurethanes usable for the reaction with monomers containing —CH=CH—CO— groups are obtainable from carbobenzoxy dialkanolamines, for example carbobenzoxy diethanolamine or N-bis-oxethyl-N′-carbobenzoxy propylene diamine, and diisocyanates, and subsequently splitting off the carbobenzoxy radical by reduction. They are also obtainable from nitroalkanediols, for example 2-ethyl-2-nitropropanediol-1,3 and diisocyanates and subsequent hydrogenation of the nitro group.

Polyaminotriazoles can be obtained in known manner from dicarboxylic acids and hydrazine or dicarboxylic acid hydrazides and hydrazine; the dicarboxylic acids which are used are those which lead to water-soluble polyaminotriazoles, for example succinic acid.

Polyethylene imine can be obtained in known manner by polymerizing ethylene imine.

Basic polyepoxide resins can be produced in known manner from primary aliphatic or aromatic bases and epichlorhydrin, for example from aniline and epichlorhydrin.

The light-sensitive compounds soluble in aqueous medium in general have a molecular weight of about 500 to about 20,000. It is, however, preferred to produce soluble compounds having a molecular weight of about 2,000 to about 10,000.

If the light-sensitive compounds soluble in aqueous medium are exposed to light with a high energy content, they change their physical and chemical properties more or less quickly due to dimerization of the double bonds of the cinnamic acid or chalcone derivative. Various sources of light can be used for the cross-linking, for example light with a strong ultra-violet component, ultra-violet light, X-rays and gamma rays. The speed of cross-linking occuring with energy irradiation can be increased by the addition of water-soluble low-molecular basic amides or esters of the aforementioned carboxylic acids which contains —CH=CH—CO— groups bonded to aromatic nuclei, for example 1,4-phenylene-bis-acrylic acid N-dimethyl propylene amide and 1,4-phenylene-bis-acrylic acid N-diethyl ethyl ester. The cross-linking speed can also be increased by adding sensitizers. It is possible with particular advantage to use compounds from the class comprising cyanines, triphenyl methane dyes, the benzanthrone series and the quinones or anthraquinones. By means of these dyes, the said reaction products are sensitized, particularly with respect to visible light. The degree of cross-linking depends on the intensity of the radiation, the time and the concentration of the

—CH=CH—CO— groups in the condensate. It can consequently be easily varied.

The light-sensitive materials which are soluble in aqueous media and which have —CH=CH—CO— groups bonded to aromatic nuclei can be dissolved in water and/or dilute aqueous inorganic acids and/or alkalies, whereupon coatings, films or foils can be cast from the solution on evaporation of the solvent.

It is particularly advantageous in many cases to make use of the cinnamic acid salts of the basic light-sensitive water-soluble compounds of high molecular weight.

Those areas which have become insoluble due to the cross-linking of the light-sensitive materials can be dissolved out by development with a suitable solvent therefor so that images with sharp contours suitable for the reproduction art are obtained. In addition, the cross-linking reaction leading to an insoluble product is also of importance as a ray indicator for X-rays and gamma rays. Water, dilute organic and inorganic acids, dilute alkalies and dilute salt solutions are particularly suitable for the development.

In order better to describe and further clarify the invention, the following are specific embodiments.

*Example 1*

About 15.0 grams (about 0.05 mol) of a basic polyurea (obtained from dipropylene triamine and 1,6-hexane diisocyanate in alcohol at −10° C.) are dissolved in about 100 cc. of dimethyl formamide and about 20 cc. of pyridine. A solution of about 5.0 grams (about 0.03 mol) of cinnamic acid chloride in about 20 cc. of dimethyl formamide is added dropwise at about 100° C. and the reaction mixture is then kept for a further 30 minutes at about 100° C.

Dimethyl formamide and excess pyridine are distilled off in vacuo; the residue is treated with dilute soda solution, washed until neutral and then dried. Yield: about 18.0 grams=about 95% of the theoretical.

The 60% cinnamoylized basic polyurea can be cast from dilute acetic acid solution to form photo-sensitive films. When a carbon arc lamp is used, the exposure time is from 10 to 12 minutes. The film has then become insoluble in 2N-acetic acid. The unexposed areas can be dissolved out with dilute acetic acid.

*Example 2*

About 12.8 grams (about 0.05 mol) of a basic polyamide (obtained from oxalic ester and spermine) are dissolved in about 100 cc. of pyridine. A solution of about 8.3 grams (about 0.05 mol) of cinnamic acid chloride in about 30 cc. of dimethyl formamide is added dropwise over a period of about 10 minutes, and then the reaction mixture is kept for about 30 minutes at about 100° C. After the dimethyl formamide and the excess pyridine have been distilled off under vacuum, the residue is treated with dilute soda solution, washed until neutral and the cinnamoylized basic polyamide is dried in vacuo. Yield: about 18.0 grams=about 93% of the theoretical.

The cinnamoylized basic polyamide can be cast from 25% acetic acid to provide photo-sensitive films. When a quartz lamp is used, the exposure time is about 4 to 6 minutes. The polyamide can be used in the reproduction art.

*Example 3*

About 2.0 grams (about 0.0073 mol) of a basic polyurethane (obtained from carbobenzoxy diethanolamine and 1,6-hexane diisocyanate with the carbobenzoxy radical subsequently being split off by reduction are dissolved in about 50 cc. of dry pyridine. A solution of about 0.62 gram (about 0.0037 mol) of cinnamic acid chloride in about 5 cc. of absolute dioxane is added dropwise at about 20° C. The reaction mixture is then heated for about 10 minutes on a water bath. After the solvent has been distilled off, the residue is treated with dilute soda solution and washed with water.

The cinnamoylized basic polyurethane can be cast from 20% acetic acid to provide photo-sensitive films. The exposure time for irradiation with ultra-violet light is about 10 to 15 minutes. The exposed film portions are insoluble, while the unexposed portions can be dissolved out by using as developer 2 N-acetic acid containing 5% of sodium sulfate.

*Example 4*

About 1.43 grams (about 0.01 mol) of α,α'-diaminopropyl methylamine and about 2.43 grams (about 0.01 mol) of 1,4-phenylene-bis-acrylic acid dimethyl ester are condensed in a nitrogen atmosphere. The condensation period is 5 hours and the temperature is from about 170° C. to about 180° C. The light brown brittle resin softens at about 135° C. and melts at from about 150° C. to about 160° C. $\eta$ rel.=1.26 (1% solution in m-cresol); K=31.

The basic polyamide is cast as a 3% solution in 20% acetic acid on to anodized aluminum foils to form photo-sensitive films. For cross-linking the film, the latter is exposed for 2 to 5 minutes to a quartz or zenon lamp. Development can be effected with water or 6% sodium sulfate solution. The resin can advantageously be used in the reproduction art for the production of matrices for printing purposes.

*Example 5*

About 1.16 grams (about 0.008 mol) of α,α'-diaminopropyl methylamine, about 0.26 gram (about 0.002 mol) of α,α'-diaminopropyl ether and about 2.46 grams (about 0.010 mol) of 1,4-phenylene-bis-acrylic acid dimethyl ester are heated in a nitrogen atmosphere while stirring for about 1 hour at about 120° C. and then for another 4 hours at from about 170° C. to about 180° C. The light yellow brittle resin obtained is readily soluble in dilute acetic acid. $\eta$ rel.=1.34 in 1% m-cresol solution; K=35.3.

The basic mixed polyamide is cast from 3.5% solution in N-acetic acid to form photo-sensitive films on aluminum plates. The exposure can take place with an ultra-violet radiator (quartz lamp, xenon lamp or arc lamp), with an X-ray tube (iron radiation) or with a gamma radiator ($Co_{60}$). The exposure time is about 2 to 4 minutes with ultra-violet light and about 8 minutes with X-ray light. An irradiation of about 200 r. is used with gamma rays. The exposed areas become insoluble and the unexposed areas can be dissolved out with normal acetic acid to which 5% of sodium sulfate or 5% of formalin solution have been added. After the films have been wiped with a solution of gum arabic, those portions of the film which are left take up a fatty dye.

*Example 6*

A solution of about 4.25 grams (about 0.0105 mol) of m-isocyanato-cinnamic acid glycol ester is added dropwise at about 100° C. to a solution of about 1.20 grams of N-methyl-diethanolamine (about 0.0101 mol) in about 20 cc. of absolute dioxane and the solution is kept at boiling point for about 1 hour in a nitrogen atmosphere. The solution is added dropwise to about 500 cc. of ether for precipitating the basic polyester urethane. The polyester urethane precipitates in the form of flakes. Melting point: 95–100° C., $\eta$ rel.=1.17; K=24.6.

The basic polyester urethane is cast as photo-sensitive films from a weak 4% acetic acid solution. The film becomes insoluble after being irradiated for about 4 to 8 minutes with a quartz lamp. Unexposed areas can be dissolved out with dilute acetic acid.

In order to increase the light sensitivity, about 25% of 1,4-phenylene-bis-acrylic acid-N-diethyl ethyl ester can be added to the acetic acid polyester urethane solution (calculated on dissolved polyester urethane). This addition reduces the exposure time to about 2 to 4 minutes. The unexposed areas can be dissolved out by briefly dipping the foil into N-acetic acid and rinsing with water.

*Example 7*

About 21.8 grams (about 0.01 mol) of N-oxyethyl-N-α-aminopropyl-ethyl-ether-n-butylamine (obtained by hydrogenating the addition product of 1 mol of acrylonitrile to N-(n-butyl)-diethanolamine) with an equivalent weight of 109.5 are heated with about 12.3 grams (about 0.05 mol) of 1,4-phenylene-bis-acrylic acid methyl ester in a nitrogen atmosphere for about 5 hours at from 170° C. to about 180° C. The basic diol-diamide formed is a yellow readily soluble resin (OH content 5.4%).

About 6.0 grams of this basic diol-diamide are dissolved in about 30 cc. of dimethyl formamide. About 3.0 grams of toluylene diisocyanate dissolved in about 20 cc. of dimethyl formamide are added dropwise at room temperature, the mixture is heated for about 30 minutes at about 50° C. and then for about 10 minutes at about 90° C. The gel which is obtained is treated with water and the precipitate formed is then dissolved while hot in about 200 cc. of 2 N-acetic acid.

Photo-sensitive films are cast from 2 N-acetic acid solution on to metal or glass supports, and these films are cross-linked by exposure for about 4 to 8 minutes with an ultra-violet radiator. The unexposed areas of the film can be dissolved out with water. For increasing the light-sensitivity, the acetic acid polyamide urethane solution has added thereto about 25% (calculated on dissolved polyamide urethane) of 1,4-phenylene-bis-acrylic-n-dimethyl propylene amide. This addition reduces the exposure time to about 2 to 4 minutes.

*Example 8*

About 24.8 grams (about 0.102 mol) of 6-nitro-2-toluidine-4-sulfonic acid are dissolved in about 100 cc. of dimethyl formamide and about 20 ccc. of pyridine. A solution of about 12.7 grams (about 0.05 mol) of 1,4-phenylene-bis-acrylic acid chloride in about 20 cc. of dimethyl formamide is added dropwise at about 10° C. and the mixture is then heated for about 1 hour at about 60° C. After the solvent has been distilled off, acidification is effected with about 250 cc. of 2 N-hydrochloric acid, and the precipitate is filtered with suction and dried in vacuo.

About 32.2 grams of the 1,4-phenylene-bis-acrylic acid-(2-methyl-3-nitro-5-sulfonic acid) anilide which is obtained (equivalent weight 334) are dissolved in about 50 cc. of concentrated ammonia and about 300 cc. of water. A solution is then prepared from about 180 grams of ferrous sulfate in about 450 cc. of water, and concentrated ammonia is added to this solution until there is a distinct smell of ammonia. The aforementioned solution of the anilide is added dropwise at about 80° C. to the iron hydroxide suspension which has thus been formed. After the reaction mixture has been kept for 1 hour at about 80° C. to about 90° C., the liquid is filtered off from the iron oxide sludge, the oxide is washed out with dilute ammonia and the combined filtrates are acidified. The precipitated 1,4-phenylene-bis-acrylic acid-(2-methyl-3-amino-5-sulfonic acid)-anilide is filtered with suction, washed with acetone and dried (equivalent weight 298).

About 5.86 grams of 1,4-phenylene-bis-acrylic acid-(2-methyl-3-amino-5-sulfonic acid)-anilide (about 0.01 mol) are dissolved in about 20.0 cc. of normal sodium hydroxide solution; about 1.70 grams (about 0.0098 mol) of toluylene diisocyanate dissolved in about 10 cc. of toluene are added at about 20° C. and the mixture is stirred for about 15 hours. The toluene is driven off by steam distillation.

Films are cast from a 5.3% aqueous solution on to anodized aluminum foils. The film is cross-linked by exposure with a quartz lamp. The unexposed areas can be dissolved out with water.

*Example 9*

About 8.6 grams of 50% polyethylene amine are dissolved in about 40 cc. of pyridine with the addition of about 10 cc. of dimethyl formamide. A solution of about 8.8 grams (about 0.05 mol) of cinnamic acid chloride in about 15 cc. of dimethyl formamide is added dropwise at about 0° C. The mixture is then heated for about 30 minutes in a water bath. The solvents are distilled off and the residue digested with dilute sodium hydroxide solution. After the supernatant alkali solution has been decanted off and after rinsing with water, the reaction mixture is dissolved in about 100 cc. of acetic acid and finally diluted with water to a total volume of about 300 cc.

Films are cast from the 4.3% solution on to any desired solid support, these films cross-linking on being irradiated with the light of a quartz lamp. The undissolved areas can be dissolved out with dilute acetic acid. The resin can be used with advantage in the reproduction art for the production of matrices ready for printing.

It is apparent from the foregoing that any basic polyurethane, any basic polyurea, any basic polyamide, any basic polyester, any basic polyamide urethane, any basic polyamide urea sulfonic acid, any basic polyamide urea carboxylic acid, any polyester urea sulfonic acid, any polyester urea carboxylic acid or the like may be used and that the invention is not limited to any particular condensation process. Any known process which will bring about condensation of one of these materials with a compound containing $$-\overset{\displaystyle H}{\overset{|}{C}}=\overset{\displaystyle H}{\overset{|}{C}}-\overset{\displaystyle O}{\overset{\|}{C}}-$$

groups may be used.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a compound soluble in aqueous media which is adapted to form a compound substantially insoluble in aqueous media upon exposure to actinic light which comprises reacting an organic diisocyanate with a dialkylolamine and subsequently reacting the product thereof with cinnamic acid chloride in an inert solvent and separating the reaction product from said inert solvent.

2. A method for making a compound soluble in aqueous media which is adapted to form a compound substantially insoluble in aqueous media upon exposure to actinic light which comprises reacting an organic diisocyanate with carbobenzoxydiethanolamine and subsequently reacting the product thereof with cinnamic acid chloride in an inert solvent and separating the reaction product from said inert solvent.

References Cited in the file of this patent

UNITED STATES PATENTS

| | | |
|---|---|---|
| 2,195,362 | Ellis | Mar. 26, 1940 |
| 2,631,993 | Morgan | Mar. 17, 1953 |
| 2,670,286 | Minsk et al. | Feb. 23, 1954 |
| 2,728,745 | Smith | Dec. 27, 1955 |
| 2,729,618 | Muller et al. | Jan. 3, 1956 |
| 2,751,373 | Unruh et al. | June 19, 1956 |
| 2,760,863 | Plambeck | Aug. 28, 1956 |
| 2,811,509 | Smith | Oct. 29, 1957 |